United States Patent
Liebig et al.

Patent Number: 5,765,509
Date of Patent: Jun. 16, 1998

[54] COMBINATION PLANT WITH MULTI-PRESSURE BOILER

[75] Inventors: Erhard Liebig, Ditzingen, Germany; Christoph Ruchti, Uster, Switzerland

[73] Assignee: Asea Brown Boveri AG, Baden, Switzerland

[21] Appl. No.: 747,405

[22] Filed: Nov. 12, 1996

[51] Int. Cl.[6] .................................................. F22D 1/00
[52] U.S. Cl. ........................... 122/7 R; 122/1 C; 122/420; 122/421
[58] Field of Search ...................... 122/7 R, 1 R, 122/1 B, 1 C, 451 S, 420, 421, 477, 476

[56] References Cited

U.S. PATENT DOCUMENTS

| | | | |
|---|---|---|---|
| 3,204,407 | 9/1965 | Meissenberg et al. | 60/39.18 |
| 3,687,115 | 8/1972 | Bell | 122/7 R |
| 3,807,364 | 4/1974 | Schwartz | 122/7 R |
| 3,841,270 | 10/1974 | Sokolowski | 122/7 R |
| 4,262,636 | 4/1981 | Augsburger | 122/7 R |
| 4,694,782 | 9/1987 | Premel et al. | 122/7 R |
| 4,854,121 | 8/1989 | Arii et al. | 122/7 R |
| 4,915,062 | 4/1990 | Dolezal | 122/7 R |
| 5,159,897 | 11/1992 | Franke et al. | 122/367.3 |
| 5,267,434 | 12/1993 | Termuehlen et al. | 122/7 R |
| 5,293,842 | 3/1994 | Loesel | 122/7 R |

FOREIGN PATENT DOCUMENTS

| | | |
|---|---|---|
| 0579061A1 | 1/1994 | European Pat. Off. |
| 4321081A1 | 1/1995 | Germany . |
| 5-240402A | 9/1993 | Japan . |
| 07119906A | 5/1995 | Japan . |
| WO89/07700 | 8/1989 | WIPO . |

*Primary Examiner*—Henry A. Bennett
*Assistant Examiner*—Jiping Lu
*Attorney, Agent, or Firm*—Burns, Doane, Swecker & Mathis, L.L.P.

[57] ABSTRACT

A mixed-pressure waste-heat boiler (7) has a forced-flow steam generator, essentially composed of a low-pressure economizer (15), of a low-pressure drum (17) and of a low-pressure evaporator (16), and a once-through forced-flow steam generator, essentially composed of a high-pressure economizer (21), of a high-pressure evaporator (22) and of a high-pressure superheater (23). The high-pressure economizer (21) is fed from the steam drum (17) of the forced-circulation steam generator via a high-pressure feed pump (20). Arranged between the high-pressure evaporator (22) and high-pressure superheater (23) is a separation bottle (25) which is connected to the steam drum (17) via a recirculation line (26). During startup, until superheated conditions are reached at the outlet of the high-pressure evaporator (22), high-pressure saturated water is recirculated into the drum (17) of the forced-circulation steam generator via the separation bottle (25).

4 Claims, 1 Drawing Sheet

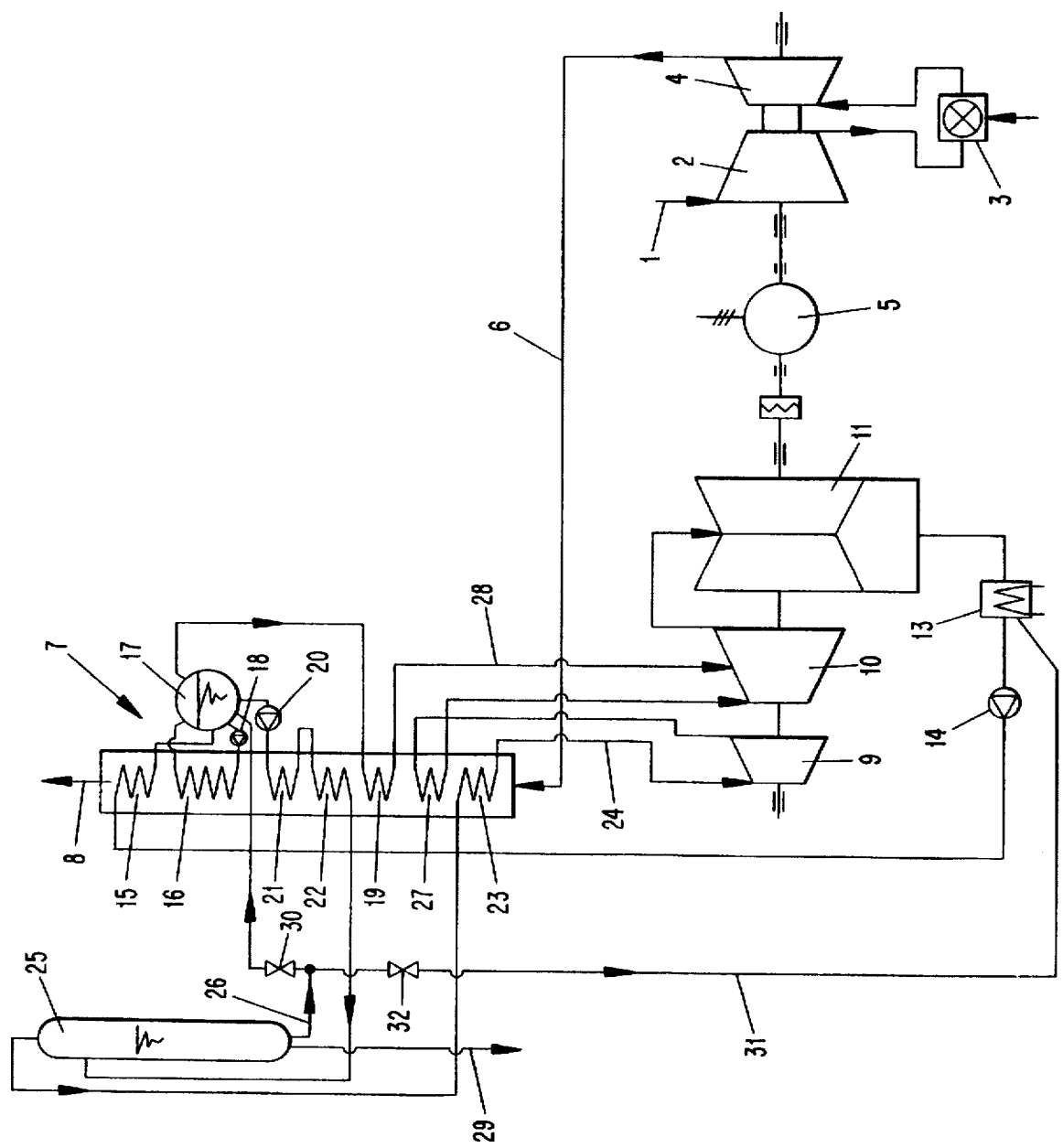

1

COMBINATION PLANT WITH MULTI-PRESSURE BOILER

BACKGROUND OF THE INVENTION

1. Field of the Invention

The invention relates to a multi-pressure waste-heat boiler with at least one forced-flow steam generator, essentially composed of a low-pressure economizer, of a low-pressure drum and of a low-pressure evaporator, and with at least one once-through forced-flow steam generator essentially composed of a high-pressure economizer, of a high-pressure evaporator and of a high-pressure superheater. It also relates to a method for operating such a plant.

2. Discussion of Background

A gas-heated multi-pressure waste-heat boiler of this type is known from DE-A-41 26 631. It is composed essentially of a forced-flow steam generator in the low-pressure stage and of a Benson evaporator in the medium-pressure and high-pressure stages. In this case, the Benson evaporator of the high-pressure stage is composed of two parts controlled in co-current with the gas stream and having heats which are converted differently. Stable flow conditions in parallel tubes of the Benson evaporator are thereby to be ensured.

SUMMARY OF THE INVENTION

The object on which the invention is based is to provide a plant of the type initially mentioned which allows the greatest possible flexibility in the mode of operation.

This is achieved, according to the invention, in that the high-pressure economizer is fed from the steam drum of the forced-flow steam generator via a high-pressure feed pump, in that a separation bottle is arranged between the high-pressure evaporator and high-pressure superheater, and in that the separation bottle is connected to the steam drum via a recirculation line.

A method for operating such a plant is distinguished in that, when the plant is being started up and until superheated conditions are reached at the exit of the high-pressure evaporator, high-pressure saturated water is recirculated into the drum of the forced-flow steam generator via the separation bottle.

The advantages of the invention are to be seen, inter alia, in that utilising the steam drum of the forced-flow steam generator as a feed water tank for the forced-flow steam generator makes it possible to dispense with a separate feed water tank. Furthermore, the separation bottle ensures the continuous superheating of the fresh steam and rules out water breakthroughs.

BRIEF DESCRIPTION OF THE DRAWING

A more complete appreciation of the invention and many of the attendant advantages thereof will be readily obtained as the same becomes better understood by reference to the following detailed description, when considered in connection with the accompanying drawing which shows diagrammatically an exemplary embodiment of the invention with reference to a combined gas/steam power plant. Only the elements essential for understanding the invention are shown. The direction of flow of the working media is represented by arrows.

DESCRIPTION OF THE PREFERRED EMBODIMENT

Referring now to the drawing, in the single figure fresh air sucked in via a line 1 is compressed in the gas turbine system to the working pressure in a compressor 2. The compressed air is strongly heated in a combustion chamber 3 fired, for example, with natural gas, and the fuel gas thus produced is expanded in a gas turbine 4 so as to produce work output. The energy thereby obtained is transmitted to a generator 5 or the compressor 2. The still hot waste gas from the gas turbine is supplied via a line 6 from the outlet of the gas turbine to a waste-heat steam generation plant 7 and, after discharging its heat, is conducted from the latter into the open via a line 8 and a chimney (not shown).

In the water/steam circuit, a multi-housing steam turbine 9, 10 and 11 is arranged on the same shaft as the gas turbine. The working steam expanded in the low-pressure turbine 11 condenses in a condenser 13. The condensate is conveyed directly into the steam generator 7 by means of a condensate pump 14. It is notable that the plant has no low-pressure preheaters, feed water tanks and high-pressure preheaters which are all, as a rule, heated by extracted steam.

The waste-heat steam generation plant 7 is designed as a vertical boiler and, in the present case, works according to a dual-pressure steam process. A horizontal boiler could, of course, also be used.

The low-pressure system is designed as a circulation system with drum, a forced-circulation system having been selected here. It is composed, in the flue gas path of the boiler, of a low-pressure economizer 15, into which the condensate is introduced, of a low-pressure evaporator 16 and of a low-pressure superheater 19. The low-pressure evaporator is connected to a drum 17 via a circulating pump 18. The superheated steam is transferred via a low-pressure steam line 28 into a suitable stage of the medium-pressure steam turbine 10.

The high-pressure system is designed as a once-through forced-flow system and can consequently be rated both for subcritical and for supercritical parameters. It is composed, in the flue gas path of the boiler, essentially of the high-pressure economizer 21, of the high-pressure evaporator 22 and of the high-pressure superheater 23. The working medium is supplied to the high-pressure economizer 21 from the low-pressure drum 17 via a high-pressure feed pump 20. The feed water tank conventional hitherto can thereby be dispensed with. The superheated steam is transferred via a fresh steam line 24 into the high-pressure part 9 of the steam turbine.

For phase separation, a separation bottle 25, into which the outlet of the high-pressure evaporator 22 opens, is provided. In the example, the separation bottle is arranged at the same height as the low-pressure drum. The separation bottle is connected at its upper end to the high-pressure superheater 23. At its lower end, it is provided additionally with a clarifying line 29. A recirculation line 26 likewise extends from the lower end of the separation bottle, said recirculation line containing a shutoff member 30 and opening into the low-pressure drum 17. A further water line 31 branches off from this recirculation line and leads to the condenser 13. A shutoff member 30 is provided in this water line too.

After partial expansion in the high-pressure part 9 of the turbine, the steam is intermediately superheated before being transferred into the medium-pressure turbine 10. In the example, this intermediate superheating takes place in heat exchange surfaces 27 which are arranged in the flue gas path of the steam generator above the high-pressure superheater 23.

By varying the pressures and mass flows in the circulation system and in the forced-flow system, a wide range of combination processes can be covered by means of such a steam generator.

The functioning of the plant working by the sliding-pressure method is explained below. It is based on a boiler with an appropriate division of the mass flows in the low-pressure system and in the high-pressure system in the ratio of 1:4 and 1:5 respectively.

During startup, first the low-pressure circulation system and high-pressure forced-flow system are filled with water, except for the respective superheaters 19, 23 and the intermediate superheater 27. Circulation in the low-pressure system is ensured via the circulating pump 18. The geodetic head, the pressure difference and the pumps likewise ensure circulation in the high-pressure system via the separation bottle and the recirculation line 26 into the low-pressure drum.

The gas turbine is subsequently started up. Its waste gases are conducted into the steam generator and there heat the water circulating in the heat exchange surfaces. As a result of the recirculation, until superheated conditions are reached at the outlet of the high-pressure evaporator 22, heat is conducted from the high-pressure forced-flow system into the drum of the low-pressure circulation system. This ensures that, during startup, the heat is kept in the region of the boiler. Thus, since there is no need for heat to be discharged to the environment via a cooling system, this procedure guarantees a highly efficient startup.

When the respective boiling temperatures are reached, steam production commences in the boiler. The first steam in the low-pressure system is generated as a result of the expansion of recirculated high-pressure saturated water from the separation bottle. The barrier steam necessary for the labyrinths of the steam turbine and the ejector steam necessary for vacuum drawing in the condenser are therefore available in the low-pressure drum at an early stage.

The separation bottle ensures that the high-pressure superheater remains dry at all times and superheated steam is available early at the boiler outlet. As soon as the pressure necessary for stable operation is reached in the high-pressure evaporator the fresh steam can be used for starting up the steam turbine in the sliding-pressure mode.

By varying the pressures in the low-pressure circulation system and in the high-pressure forced-flow system and the recirculation mass flow for commencing the startup, the moment of commencement of steam generation and the steam parameters, such as pressure, temperature and mass flow, can be influenced according to the actual conditions of the plant. This procedure guarantees high flexibility during startup.

Regulation takes place solely via the speed-regulated feed pump, the fresh steam temperature being set via the mass flow. Of course, the feed pump can be operated just as well at a constant speed, with subsequent throttling of the feed water to the desired pressure.

The startup method described is particularly suitable for the hot starting of the plant.

The conditions are different for cold starting. In this case, it is expedient to prevent water and moisture breakthroughs to the turbine. As a rule, during cold starting, the feed water circulates at least partially round the feed pump 20. As a result of throttling downstream of the feed pump, pressure losses in the pipelines and fittings and, if appropriate, an open clarifying line 29, the pressure in the separation bottle becomes too low to guarantee recirculation to the low-pressure drum. It must be remembered, furthermore, that saturated water evaporates out in the event of a pressure drop, and this may lead to erosion and water shocks. A remedy is provided, here, by the measure whereby the recirculation water is at least partially discharged until superheated conditions are reached at the outlet of the high-pressure evaporator 22. The water circulated from the separation bottle can, for example, be guided directly into the condenser 13 via the water line 31 or else be discarded via the clarifying line 29. The latter will be carried out, in particular, during cold starting after a lengthy stoppage, when there may be doubts as to the water quality.

Only when steam production commences will the pressure in the separation bottle 25 rise. If there is a normal water level in the separation bottle and if there is a sufficient pressure difference, that is to say at least 3 bar, between the separation bottle and low-pressure drum 17, the high-pressure saturated water from the separation bottle will be recirculated into the drum of the forced-circulation steam generator solely by means of this pressure difference. The advantage of this method variant is that a conveying pump or the geodetic head difference between the water level in the separation bottle and that in the low-pressure drum can be dispensed with. In particular, this geodetic head difference leads to constraints in arrangement, in particular to a special boiler structure, thus having an adverse effect on investment.

Even when there is a high water level in the separation bottle 25, which may occur in the case of a low pressure, or if the pressure difference is too small for recirculation or if too much moisture is introduced, the recirculation water will advantageously first be diverted until there is a sufficiently large pressure difference for recirculation or until superheated conditions are reached at the outlet of the high-pressure evaporator 22, and only then will the recirculation water be conducted into the low-pressure drum.

It may be considered a basic rule that, for the purpose of a rapid startup or high energy utilization, as much water as possible is recirculated from the separation bottle 25 into the low-pressure drum 17.

Of course, the invention is not restricted to the exemplary embodiment shown and described. Thus, multi-pressure processes are also conceivable, in which case the pressure stages working by once-through forced flow are each fed from the drums of the circulation systems. Of course, contrary to said forced circulation of the low-pressure system, a natural-circulation system can be employed just as well. Furthermore, the invention is not tied to the presence of superheaters and intermediate superheaters. Contrary to the solutions described, according to which the geodetic head or the pressure difference is utilized for recirculation from the separation bottle into the low-pressure drum, it may be appropriate to provide a separate circulating pump for this purpose.

Obviously, numerous modifications and variations of the present invention are possible in light of the above teachings. It is therefore to be understood that, within the scope of the appended claims, the invention may be practiced otherwise than as specifically described herein.

What is claimed:

1. A gas-heated mixed-pressure waste-heat boiler comprising:
    at least one forced-circulation steam generator circuit, including a low-pressure economizer having an inlet to receive condensate as a working medium from a steam turbine condenser, a low-pressure drum connected to receive the working medium from the low-pressure economizer and a low-pressure evaporator connected to receive the working medium from the drum and return evaporated working medium to the drum, at least one once-through forced-flow steam generator circuit, including a high-pressure economizer connected to receive working medium from the drum, a forced-circulation pump connected between the drum and the high-pressure economizer to feed the working medium to the high-pressure economizer, a high-pressure evaporator connected to receive working medium from the high-pressure economizer, a separation bottle connected to receive working medium from the high-pressure evaporator and a high-pressure superheater connected to receive a separated component of the working medium from the separation bottle and having an outlet to connect to deliver high pressure steam to the steam turbine, wherein the separation bottle is connected to the steam drum via a recirculation line and has an outlet line to connect to a condenser for a steam turbine, and means for selectively closing the outlet line of the separation bottle.

2. A method for operating a gas-heated multi-pressure waste heat boiler having at least one circulation type steam generator with a low-pressure drum and at least one forced flow steam generator having a high-pressure economizer supplied by a high-pressure feed pump with working medium from the steam drum of the circulation type steam generator, a high-pressure evaporator connected to receive working medium from the high-pressure economizer and deliver steam to a separation bottle, and a high-pressure superheater connected to receive a separated working component from the separation bottle, the high-pressure superheater being connected to supply steam to a downstream steam turbine system having a condenser, and the separation bottle being connected to recirculate working medium to the drum by a line having a shut off valve, the method comprising step immediately after start-up of:

recirculating high-pressure saturated water through a circuit formed by the high-pressure economizer, the high-pressure evaporator, separation bottle and the drum of the until superheated conditions are reached at the outlet of the high-pressure evaporator.

3. The method as claimed in claim 2, further comprising the steps of:

determining a water level in the separation bottle;

determining a pressure difference between the separation bottle and the low-pressure drum;

if the pressure difference is at least a predetermined value, allowing the pressure difference to cause the high-pressure saturated water to recirculate.

4. The method as claimed in claim 2, further comprising the steps of:

determining a water level in the separation bottle;

determining a pressure difference between the separation bottle and the low-pressure drum;

if the pressure difference is below a predetermined value, discharging water from the separation bottle until one of the predetermined value for the pressure difference, a predetermined water level in the separation bottle, and a superheated condition at the outlet of the high-pressure evaporator is reached.

* * * * *